United States Patent [19]  [11]  4,351,930
Patnaik  [45]  Sep. 28, 1982

[54] PROPYLENE COPOLYMERIZATION PROCESS AND PRODUCT

[75] Inventor: Birendra K. Patnaik, Parsippany, N.J.

[73] Assignee: El Paso Polyolefins Company, Paramus, N.J.

[21] Appl. No.: 232,060

[22] Filed: Feb. 5, 1981

[51] Int. Cl.$^3$ .................. C08F 210/06; C08F 4/02
[52] U.S. Cl. .................. 526/125; 526/348.6
[58] Field of Search .................. 526/125, 348.6

[56] References Cited

U.S. PATENT DOCUMENTS

| | | | |
|---|---|---|---|
| 3,959,409 | 5/1976 | Frese et al. | 526/348.6 |
| 4,161,574 | 7/1979 | Strametz et al. | 526/348.6 |
| 4,187,196 | 2/1980 | Giannini et al. | 526/125 |
| 4,242,231 | 12/1980 | Ueno et al. | 526/125 |
| 4,253,984 | 3/1981 | Imai et al. | 526/125 |

FOREIGN PATENT DOCUMENTS

| | | | |
|---|---|---|---|
| 2505825 | 8/1975 | Fed. Rep. of Germany | 526/125 |
| 3007418 | 9/1980 | Fed. Rep. of Germany | 526/125 |

Primary Examiner—Edward J. Smith
Attorney, Agent, or Firm—Fred S. Valles; Margareta LeMaire

[57] ABSTRACT

The polymerized ethylene content of a copolymer of ethylene and propylene is enhanced without lowering the isotacticity of the copolymer when the polymerization is conducted in the presence of small amounts of butene-1.

15 Claims, No Drawings

PROPYLENE COPOLYMERIZATION PROCESS AND PRODUCT

BACKGROUND OF THE INVENTION

Recently new catalysts have been developed which are far more active than conventional unsupported titanium halide organoaluminum systems catalyst in the polymerization of alpha-olefins. Briefly described, these new catalysts are comprised of a titanium halide catalyst component supported on magnesium dihalide and an alkylaluminum compound, which can be present as a complex with an electron donor compound. These catalyst components have been described in the patent literature, e.g. in U.S. Pat. Nos. 3,830,787, 3,953,414, 4,051,313, 4,115,319 and 4,149,990.

The productivities obtained with these new catalysts are extremely high resulting in polymers containing such small quantities of residual catalyst that the conventional deashing step can be dispensed with. The catalysts function well in the homopolymerization of propylene and in the copolymerization of a mixture of propylene and another alpha-olefin such as ethylene, especially when the polymerization reaction is carried out in a liquid diluent, e.g., liquid propylene monomer ("liquid pool" polymerization).

In large scale, continuous liquid pool copolymerization of ethylene and propylene there is a practical upper concentration limit of ethylene that can be incorporated into the copolymer before operational problems are encountered, e.g., in the filter separation of the product from unreacted monomer. These problems are due to less than acceptable isotactic indices (II) of the copolymer products. Since an increase in polymerized ethylene content is generally accompanied by a decrease in isotactic index (=% heptane insolubles) it has hitherto been the practice to limit the polymerized ethylene content to about 2-3 wt %. Although such copolymers of relatively low ethylene contents have found many uses and can be fabricated into a variety of articles of manufacture, their application in the fabrication of heat sealable films has been precluded because of the relatively high melting points of low ethylene-content copolymers.

It is, therefore, an object of this invention to provide an improved process for the liquid pool production of polymers of ethylene and propylene.

It is another object to improve the reactivity of ethylene in a liquid pool polymerization process for the production of polymers of ethylene and propylene.

It is a further object to provide a novel polymer of ethylene and propylene having an enhanced polymerized ethylene content as well as acceptable isotacticity.

It is still another object to provide a polymer of ethylene and propylene suitable for fabrication of heat sealable films.

These and other objects will become apparent from a reading of the specification and the appended claims.

THE INVENTION

The above objects are achieved in a process for the production of a copolymer propylene and ethylene wherein the polymerization of propylene and ethylene is conducted at pressures sufficient to maintain propylene in liquid phase and at temperatures between about 115° F. and about 165° F. in the presence of a catalyst composition containing the components (a) an aluminum trialkyl at least partially complexed with an aromatic carboxylic acid ester electron donor and (b) a complex of a titanium tri - or tetrahalide with an aromatic carboxylic acid ester electron donor supported on magnesium halide the components (a) and (b) being provided in a molar ratio of Al/Ti between about 10 and about 400, where the improvement comprises: adding from about 0.5 to about 15 percent by weight of butene-1 based on the weight of propylene feed to the polymerization zone. Preferably the butene-1 concentration is limited to a range between about 1 and about 8 percent by weight based on the propylene feed.

Ethylene is introduced to the polymerization zone in amounts ranging from about 1 to about 9 weight percent based on the weight of the propylene feed. Preferably the range is maintained between about 2 and about 4 weight percent.

The polymer product of the invention contains from about 80 to about 96.5 weight percent propylene, from about 3 to about 17 weight percent ethylene and from about 0.5 to about 5 weight percent butene-1.

It was completely unexpected to find that when butene-1 is present in the polymerization zone the ethylene incorporation is significantly increased, and that said increase is not accompanied by a detrimental decrease in isotactic index of the polymer product. The incorporation of polymerized butene-1 with the polymer is quite small usually roughly up to about 3 weight percent based on the total weight of the total polymer weight.

The copolymerization process can be carried out in batch wise, semi-continuous or continuous fashion. The polymer is formed in the reactor employing liquid propylene as diluent and a catalyst for the polymerization carrying out the polymerization to a polymer solids content of from 5 to 60%, but preferably 10 to 40%. The propylene functions as a feed component as well as the liquid diluent, except for small quantities of inert diluent hydrocarbons, e.g., hexane, mineral oil, petrolatum, etc., that may be used for the introduction of the catalyst components into the reaction zone.

Temperatures at which the polymer formation can be carried out are those known in the art, for example, from 50° F. to 250° F., preferably from 115° F. to 165° F. and most preferably from 125° F. to about 155° F. The pressures used in the reaction can range up to about 500 psig and even higher.

The catalyst used in the process is a two-component composition which can be any one of the recently developed, high activity magnesium halide supported catalyst components and organoaluminum cocatalyst components disclosed, e.g., in U.S. Pat. Nos. 3,830,787, 3,953,414, 4,015,313, 4,115,319 and 4,149,990, hereby incorporated in this application by reference. The components are introduced separately into the polymerization reactor. Component (a) of the catalyst composition is advantageously selected from trialkyl aluminum containing from 1 to 8 carbon atoms in the alkyl group, such as triethyl aluminum, tri-methyl aluminum, tri-n-butyl aluminum, tri-isobutyl aluminum, tri-isohexyl aluminum, tri-n-octyl aluminum and tri-isooctyl aluminum.

The trialkyl aluminum is at least partially complexed with an electron donor prior to introduction into the polymerization reactor. Best results are achieved when esters of aromatic acids, are used as the electron donors.

Some typical examples of such compounds are methyl- and ethylbenzoate, methyl- and ethyl-p-methoxybenzoate, ethyl-o-chlorobenzoate, ethylnaphthenate, methyl-p-toluate, ethylanisate, and the like. The molar ratio of aluminum alkyl to electron donor can range between 1 and 100, preferably between 2 and 5. Solutions of the electron donor and the trialkyl aluminum compound in a hydrocarbon such as hexane or heptane are preferably prereacted for a certain period of time generally less than 1 hour prior to feeding the mixture into the polymerization reaction zone.

The other component of the catalyst composition is a complex of a titanium tri- or tetrahalide with an electron donor compound supported on magnesium dihalide. The halogen in the respective halides can be chlorine, bromine or iodine, the preferred halogen being chlorine. The electron donor is suitably selected from the esters of aromatic carboxylic acids, such as benzoic acid, p-methoxybenzoic acid and p-toluic acids and particularly the alkyl esters of said acid. The magnesium to electron donor molar ratio are equal to or higher than 1 and preferably between 2 and 10. Generally, the titanium content expressed as titanium metal ranges between 0.1 and 20 wt percent in the supported catalyst component and preferably between 1 and 3 weight percent.

The catalyst components, i.e., the organoaluminum component (a) and the titanium halide component (b) are fed to the polymer reaction zone in amounts such that the Al/Ti molar ratio is maintained preferably between about 10 and 400. The monomer feed to Ti metal weight ratio is usually in the range of 500,000 and 1,500,000.

Hydrogen is advantageously also added to the polymerization zone to aid in increasing the melt flow. Usually the hydrogen concentration in the monomer is maintained between about 0.1 and about 1.0 mole percent and preferably below about 0.75.

In commercial use the process of this invention is preferably carried out in continuous fashion, i.e., monomer feed and catalyst components are continuously fed to the reactor while a slurry of polymer product in liquid propylene is withdrawn continuously or "pseudo"—continuously. This slurry is separated into polymer product and unreacted monomer, which is advantageously returned to the reaction system. Alternatively, the recovery polymer, still containing active catalyst may be further reacted in a subsequent polymerization zone with additional monomers to produce a block copolymer product.

Because of the generally high productivity of the supported catalyst system expressed in terms of pounds of polymer produced per pound of titanium metal, there is no need to remove catalyst residues from the polymer in a deashing step as is the case with conventional catalyst.

Various additives can, if desired, be incorporated into the polypropylene resin, such as fibers, fillers, antioxidants, metal deactivating agents, heat and light stabilizer, dyes, pigments, lubricants and the like.

In addition to the fabrication of film the polymers can be used with advantage in the manufacture of fibers and filaments by extrusion, of rigid articles by injection molding, and of bottles by blow molding techniques.

The following examples further illustrate the advantages obtained by the invention.

EXAMPLES 1 THROUGH 5

Each of the experiments were carried out using the following procedure unless otherwise indicated.

Into a one liter jacketed and magnetically stirred autoclave maintained at 25° C. and under a propylene purge, was introduced a premixed (7 minute contact time) heptane solution of 2.0 mmole triethylaluminum (TEAL) and 0.67 mmole methyl p-toluate (MPT) followed by 20 mg of a magnesium chloride-supported titanium chloride catalyst. The titanium catalyst was a commercially available catalyst, containing about 1.5 weight percent titanium, 20.3 weight percent magnesium, 60.0 weight percent chlorine and 9.6 weight percent hydrocarbon volatiles. Ethylbenzoate had been used in the manufacture of the supported titanium chloride catalyst component. The catalyst was introduced as a slurry in mineral oil to the autoclave which was then pressurized to 25 psi with hydrogen. Propylene (600 ml) and butene-1 were charged to the reactor and then 25 psi of ethylene (3.1 weight percent based on propylene charge) was introduced. The reactor contents were brought to 55° C. and after 1 hour polymerization, the product was recovered and characterized. Results are summarized in Table I.

As seen from a comparison of the data of Examples 1–3, increasing ethylene content in a copolymer of ethylene and propylene prepared in the absence of butene-1, causes expected decreases in isotactic index and in DSC (Differential Scanning Calorimeter) Melt Temperature. However, when the copolymerization is carried out at the same conditions but in the presence of butene-1 as in Examples 4 and 5, the ethylene incorporation is dramatically increased and, more importantly, the isotactic index of the polymer product is essentially unaffected by the increase in ethylene content, while the desired decrease in melting point is effected.

It is obvious to those skilled in the art that many variations and modifications can be made to the process and the polymer of this invention. All such departures from the foregoing specification and considered within the scope of this invention as defined by the specification and the appended claims.

TABLE I

| Example | Comonomers ethylene psi | Comonomers butene g | Productivity Kg/g Ti | I.I. % | MF g/10 min | %= $C_2$ | DSC Melt Temp °C. |
|---|---|---|---|---|---|---|---|
| 1(Control)[1] | — | — | 371 | 92.6 | 5.4 | — | 167 |
| 2(Control) | 25 | — | 474 | 84.2 | 1.5 | 2.7 | 151 |
| 3(Control) | 25 | — | 393 | 86.1 | 3.3 | 2.3 | 159 |
| 4 | 25 | 13 | 374 | 85.3 | 0.7 | 5.5 | 142 |
| 5 | 25 | 14 | 347 | 86.7 | 0.7 | 8.4 | 140 |

[1]Polymerization temperature 65° C.

What is claimed is:

1. In a process for the production of a copolymer of propylene and ethylene wherein the polymerization of propylene and ethylene is conducted in the presence of a liquid diluent consisting essentially of propylene at pressures sufficient to maintain propylene in liquid phase and at temperatures between about 115° F. and about 165° F. in the presence of a catalyst composition containing the components (a) an aluminum trialkyl at least partially complexed with an aromatic carboxylic acid ester electron donor and (b) a complex of a titanium tri- or tetrahalide with an aromatic carboxylic acid ester electron donor supported on magnesium halide the components (a) and (b) being provided in a molar ratio of Al/Ti between about 10 and about 400, the method of increasing the polymerized ethylene content of the polymer without significantly affecting the isotactic index, which comprises: providing from about 1 to about 9 weight percent ethylene feed based on the weight of propylene feed; adding from about 1 to about 8 percent by weight of butene-1 based on the weight of propylene feed to the polymerization zone, and recovering a polymer product having a propylene content of from about 80 to about 96.5 weight percent, and ethylene content of from about 3 to about 17 weight percent and a butene-1 content of from about 0.5 to about 5 weight percent.

2. The process of claim 1 wherein the concentration of ethylene feed to the polymerization zone based on the weight of propylene feed is maintained between about 2 and about 4 weight percent.

3. A process according to claim 1, wherein the aluminum trialkyl is one containing from 1 to 8 carbon atoms in the alkyl groups.

4. A process according to claim 1, wherein the aluminum trialkyl is triisobutyl aluminum.

5. A process according to claim 1, wherein the electron donor compound of component (a) of the catalyst composition is methyl-p-toluate.

6. A process according to claim 1, wherein the molar ratio of trialkyl aluminum to electron donor in component (a) ranges between about 1 and about 100.

7. A process according to claim 6, wherein the molar ratio is between about 2 and about 5.

8. The process of claim 1, wherein component (a) is prepared by prereacting the aluminum trialkyl with the electron donor for less than one hour prior to polymerization.

9. The process of claim 1, wherein the titanium tri- or tetrahalide is a titanium trichloride or titanium tetrachloride.

10. The process of claim 1, wherein the magnesium dihalide is magnesium dichloride.

11. The process of claim 1, wherein the electron donor compound of component (b) is ethylbenzoate.

12. The process of claim 1, wherein the magnesium to electron donor molar ratio of component (b) is at least about 1.

13. The process of claim 12, wherein said molar ratio is between about 2 and about 10.

14. The process of claim 1, wherein the titanium content expressed as titanium metal ranges between about 0.1 and about 20 weight percent in the supported catalyst component (b).

15. The process of claim 14, wherein the titanium content is between about 1 and about 3 weight percent.

* * * * *